US010154660B1

(12) United States Patent
Matthews et al.

(10) Patent No.: US 10,154,660 B1
(45) Date of Patent: Dec. 18, 2018

(54) FASTENERLESS SUPPORT BRACKET FOR PORTABLE COOLERS

(71) Applicant: 3Bills, LLC, Greensboro, NC (US)

(72) Inventors: Bradley J. Matthews, Summerfield, NC (US); Jeffrey A. Younginer, Summerfield, NC (US)

(73) Assignee: 3Bills, LLC, Greensboro, NC (US)

( * ) Notice: Subject to any disclaimer, the term of this patent is extended or adjusted under 35 U.S.C. 154(b) by 0 days.

(21) Appl. No.: 15/440,587

(22) Filed: Feb. 23, 2017

Related U.S. Application Data

(60) Provisional application No. 62/298,718, filed on Feb. 23, 2016.

(51) Int. Cl.
| A01K 97/10 | (2006.01) |
| B65D 25/20 | (2006.01) |
| B65D 43/16 | (2006.01) |
| B65D 43/22 | (2006.01) |
| F25D 3/08 | (2006.01) |

(52) U.S. Cl.
CPC .............. *A01K 97/10* (2013.01); *B65D 25/20* (2013.01); *B65D 43/163* (2013.01); *B65D 43/22* (2013.01); *F25D 3/08* (2013.01)

(58) Field of Classification Search
CPC ........ A01K 97/00; A01K 97/06; A01K 97/08; A01K 97/10; A01K 97/11; A45C 11/20; A45C 13/00; A45C 13/005; A45C 13/02; A45C 13/06; A47G 19/00; B65D 21/02; B65D 25/20; B65D 13/16; B65D 13/163; B65D 13/22; B65D 81/38; B65D 81/3813;

(Continued)

(56) References Cited

U.S. PATENT DOCUMENTS

| 3,964,706 A | * | 6/1976 | Adams .................... | A01K 97/10 248/513 |
| 4,257,181 A | * | 3/1981 | Cooper .................. | A01K 97/10 248/530 |

(Continued)

FOREIGN PATENT DOCUMENTS

| JP | 10262532 A | * | 10/1998 | ............. A01K 97/10 |
| JP | 3176641 U | * | 6/2012 | ............. A01K 97/10 |

OTHER PUBLICATIONS

Dargel, Ice Chest Fighting Gimbal, Nov. 2007, http://www.2coolfishing.com/ttmbforum/showthread.php?t=1380794.

(Continued)

*Primary Examiner* — Bryon Gehman
(74) *Attorney, Agent, or Firm* — MacCord Mason PLLC

(57) ABSTRACT

A cooler having a support bracket. The apparatus includes a cooler having a bottom, sidewalls and a lid, and a fastenerless support bracket. The fastenerless support bracket includes a cantilevered plate; a primary stop adjacent to the inside of one of the sidewalls, the primary stop adapted to prevent the cantilevered plate from sliding in a first direction; and a secondary stop adjacent to the upper portion of one of the sidewalls adapted to prevent the cantilevered plate from sliding in a second direction. The primary stop and the secondary stop are at a proximate portion of the cantilevered plate and adapted to be clamped between the lid and one of the sidewalls of the cooler. The cantilevered plate may be adapted to receive a fishing rod holder assembly attached to the distal end of the fastenerless support bracket.

32 Claims, 15 Drawing Sheets

(58) Field of Classification Search
CPC ...... B65D 43/16; B65D 43/163; B65D 43/22; F25D 3/08
USPC .............................. 43/21.1, 21.2, 54.1–57.1
See application file for complete search history.

(56) References Cited

U.S. PATENT DOCUMENTS

| | | | | |
|---|---|---|---|---|
| 4,841,661 | A * | 6/1989 | Moore | A01K 97/06 43/54.1 |
| 4,858,394 | A | 8/1989 | Butts | |
| 6,869,146 | B2 | 4/2005 | Gollahon | |
| 9,433,200 | B2 * | 9/2016 | Norman | A01K 97/08 |
| 9,913,464 | B1 * | 3/2018 | Stokes | F16M 13/02 |
| 2007/0216154 | A1 * | 9/2007 | Casagrande | A01K 97/06 283/61 |
| 2013/0299667 | A1 * | 11/2013 | Casagrande | A01K 97/06 248/542 |
| 2016/0025264 | A1 * | 1/2016 | Casagrande | A01K 97/10 248/205.9 |
| 2018/0153151 | A1 * | 6/2018 | Stokes | F16M 13/02 |

OTHER PUBLICATIONS

Yeti, Fishing Rod Holster. http://yeti.com/fishing-rod-holster.
Yeti, Beverage Holder, http://yeti.com/beverage-holder.

* cited by examiner

|  | | | | |
|---|---|---|---|---|
| Above Plate (Class 1 Lever) | 3 | 3 | 4 | 5 |
| Below Plate (Class 3 Lever) | 1.5 | 1.5 | 2 | 2.5 |
| Components | 2 | 3 | 2 | 1 |
| | Two Piece Mounting Arm Assembly | One Piece Mounting Arm Assembly (when components assembled) | | |

FIG. 11

FASTENERLESS SUPPORT BRACKET FOR PORTABLE COOLERS

This application claims the benefit of Provisional Application Ser. No. 62/298,718 filed Feb. 23, 2016.

BACKGROUND

Field

The present inventions relate generally to portable coolers and, more particularly, to a fastenerless support bracket adapted to receive a fishing rod holder assembly attached to the distal end of the fastenerless support bracket.

Related Art

Angling large fish requires the use of additional equipment so that the angler can effectively hold the fishing rod and reel in the fish. Fighting chairs are commonly used to provide support for an angler, and typically comprise of a chair mounted onto a boat with a gimbal installed. The angler inserts a lower portion of the fishing rod's handle butt cap into a holder installed onto the gimbal. While sitting in the fighting chair, the angler grasps the rod with one hand and reels in the fish with the other hand. A footrest is commonly available to provide additional support.

If an angler wishes to stand, another option is the use of a gimbal installed on a harness. Various styles are available, including shoulder, kidney, and bucket-type harnesses. These harnesses may also be used in combination with a fighting chair.

Not all boats are equipped with fighting chairs, thereby limiting an angler's options for catching big game fish. Moreover, fighting chairs are permanent fixtures occupying valuable space within the boat. Fighting chairs can also be prohibitively expensive for many individuals.

Thus, there remains a need for a support bracket for a fishing rod holder assembly which is adapted to enable an angler to catch larger fish while sitting down on a cooler normally already on the boat while, at the same time is adapted to be clamped between the lid and one of the sidewalls of the cooler to allow it to be quickly removable and portable to limit the amount of space occupied by accessories.

SUMMARY

The present inventions are directed to a cooler having a support bracket. The apparatus includes a cooler having a bottom, sidewalls and a lid; and a fastenerless support bracket. The fastenerless support bracket includes (i) a cantilevered plate; (ii) a primary stop adjacent to the inside of one of the sidewalls, the primary stop adapted to prevent the cantilevered plate from sliding in a first direction; and (iii) a secondary stop adjacent to the upper portion of one of the sidewalls adapted to prevent the cantilevered plate from sliding in a second direction, wherein the primary stop and the secondary stop are at a proximate portion of the cantilevered plate and adapted to be clamped between the lid and one of the sidewalls of the cooler. The cantilevered plate may be adapted to receive a fishing rod holder assembly attached to the distal end of the fastenerless support bracket.

In one embodiment, the cantilevered plate includes a first clamping area on the cantilevered plate adapted to be clamped between the lid and one of the sidewalls of the cooler in order to secure the cantilevered plate to the cooler. The cantilevered plate may further include a second clamping area on the cantilevered plate adapted to be clamped between the lid and one of the sidewalls of the cooler in order to secure the cantilevered plate to the cooler, the second clamping area located between the primary stop and the secondary stop. In one embodiment, the first clamping area is located between the second clamping area and the secondary stop.

The cantilevered plate may include an attachment area on the distal end of the cantilevered plate for receiving a fishing rod holder assembly. The attachment area may be a generally horizontal surface. In one embodiment, the generally horizontal surface is flanged on at least one side to increase the rigidity of the generally horizontal surface.

The apparatus may further include a mounting arm assembly attached to the cantilevered plate and adapted to mount the fishing rod holder assembly. In one embodiment, the mounting arm assembly is mounted to the top surface of the attachment area of the cantilevered plate. In another embodiment, the mounting arm assembly may be formed from one piece when assembled and mounted onto the cantilevered plate to reduce torsional loads. In one embodiment, the one piece is formed by a single piece. In another embodiment, the one piece may comprise a pair of mounting arms attached to a connecting body. In another embodiment, the mounting arm assembly may comprise two pieces when assembled and mounted onto the cantilevered plate.

The mounting arm assembly may be affixed to the cantilevered plate using a first fastener and a second fastener, the first fastener having a compressive force applied when a tension force is applied to the second fastener. In one embodiment, the first fastener and the second fastener are countersunk machine screws.

The apparatus may further include a second secondary stop adjacent to the outside of one of the sidewalls also adapted to prevent the cantilevered plate from sliding in the second direction. In one embodiment, the edge of the second secondary stop adjacent to the outside of one of the sidewalls of the cooler defines a fulcrum and the distance between the proximate end of the cantilevered plate and the second secondary stop is greater than or equal to the distance between the second secondary stop extending inside the cooler between the lid and one of the sidewalls of the cooler and that the distal end of the cantilevered plate extending past the outside of one of the sidewalls, whereby a downward force transmitted from the distal end of the cantilevered plate by the fishing rod holder assembly will remain less than an upward force transmitted by the proximate end of the cantilevered plate to the lid.

The cantilevered plate may include a support brace adapted to prevent the distal end of the cantilevered plate from bending downwardly. In one embodiment, the support brace is a lower support installed on the bottom surface of the cantilevered plate. The lower support may be wedge-shaped. In one embodiment, the lower support is a substantially rigid wall positioned generally perpendicularly with respect to the horizontal surface of the cantilevered plate. The lower support may be an inverted T-shaped brace. In one embodiment, the inverted T-shaped brace is positioned generally diagonally with respect to the horizontal surface of the cantilevered plate. The apparatus may further include a plurality of inverted T-shaped braces forming a support truss.

The attachment area may further include a cavity adapted to provide clearance for movement of the fishing rod holder assembly. In one embodiment, the fishing rod holder assembly includes a gimbal rotatably mounted onto the fastenerless support bracket. The fishing rod holder assembly may further include a fishing rod butt rest rotatably mounted onto the gimbal and adapted to receive the handle butt cap of a fishing rod. In one embodiment, the fishing rod butt rest is generally cylindrical shaped. The fishing rod holder assembly may further including a stop pin adapted to mate with the lower end of the handle butt cap of the fishing rod.

The cooler lid may is hinged to the top of the sidewalls. Also, the cooler may further including a lock assembly adapted to close and secure the lid onto the cooler.

Accordingly, one aspect of the present inventions is to provide a cooler having a support bracket, the apparatus including (a) a cooler having a bottom, sidewalls and a lid; and (b) a fastenerless support bracket adapted to be clamped between the lid and one of the sidewalls of the cooler.

Another aspect of the present inventions is to provide a fastenerless support bracket for a portable cooler having a bottom, sidewalls and a lid, the fastenerless support bracket adapted to be clamped between the lid and one of the sidewalls of the cooler, the apparatus including (a) a cantilevered plate adapted to receive a fishing rod holder assembly; (b) a primary stop adjacent to the inside of one of the sidewalls, the primary stop adapted to prevent the cantilevered plate from sliding in a first direction; and (c) a secondary stop adjacent to the upper portion of one of the sidewalls adapted to prevent the cantilevered plate from sliding in a second direction, wherein the primary stop and the secondary stop are at a proximate portion of the cantilevered plate and adapted to be clamped between the lid and one of the sidewalls of the cooler.

Still another aspect of the present inventions is to provide a cooler having a support bracket, the apparatus including (a) a cooler having a bottom, sidewalls and a lid; (b) a fastenerless support bracket, the fastenerless support bracket including (i) a cantilevered plate adapted to receive a fishing rod holder assembly; (ii) a primary stop adjacent to the inside of one of the sidewalls, the primary stop adapted to prevent the cantilevered plate from sliding in a first direction; and (iii) a secondary stop adjacent to the upper portion of one of the sidewalls adapted to prevent the cantilevered plate from sliding in a second direction, wherein the primary stop and the secondary stop are at a proximate portion of the cantilevered plate and adapted to be clamped between the lid and one of the sidewalls of the cooler; and (c) a fishing rod holder assembly attached to the distal end of the fastenerless support bracket.

These and other aspects of the present inventions will become apparent to those skilled in the art after a reading of the following description of the embodiments when considered with the drawings.

BRIEF DESCRIPTION OF THE DRAWINGS

FIG. 11 is a graphic illustration providing a visual representation of the relationship between the mounting position and the number of pieces of the mounting arm assembly;

DETAILED DESCRIPTION OF THE EMBODIMENTS

Figure 1:
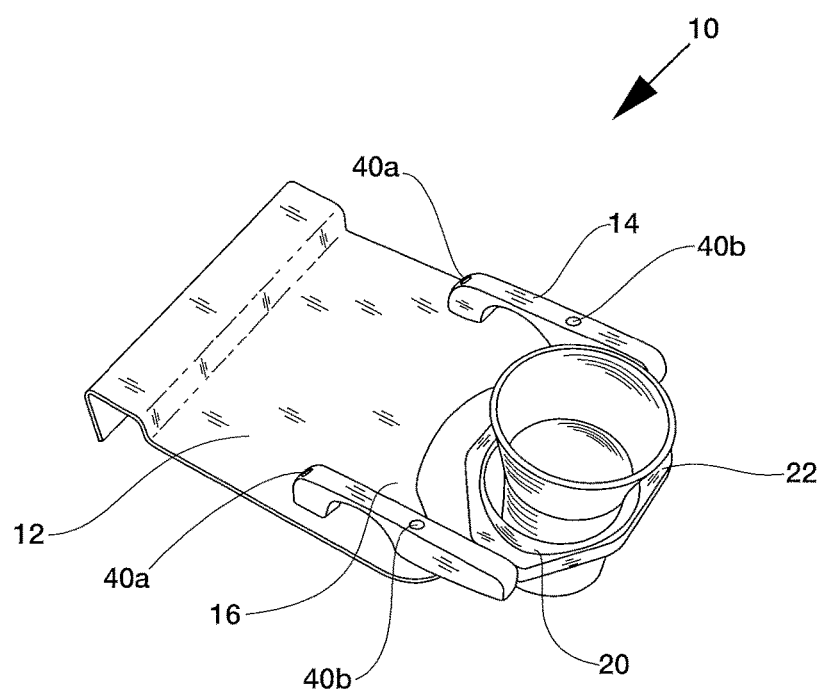
FIG. 1 is an overhead perspective view of one embodiment of a fastenerless support bracket adapted for a fishing rod holder assembly constructed according to the present inventions.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the inventions and are not intended to limit the inventions thereto. As best seen in FIG. 1, a fastenerless support bracket for a fishing rod holder assembly for a portable cooler, generally designated 10, is shown constructed according to the present inventions. The fastenerless support bracket for a fishing rod holder assembly 10 comprises a cantilevered plate 12 with an attachment area 16 located near or at a distal end of the plate for receiving a fishing rod holder assembly and a primary stop located toward a proximate end of cantilevered plate 12 for securing the device 10. The attachment area itself may comprise a generally horizontal surface and may also be flanged on one or both sides to provide additional support to cantilevered plate 12. The attachment area 16 typically includes one or more supports 14 adapted to mount a fishing rod holder assembly.

Figure 2:
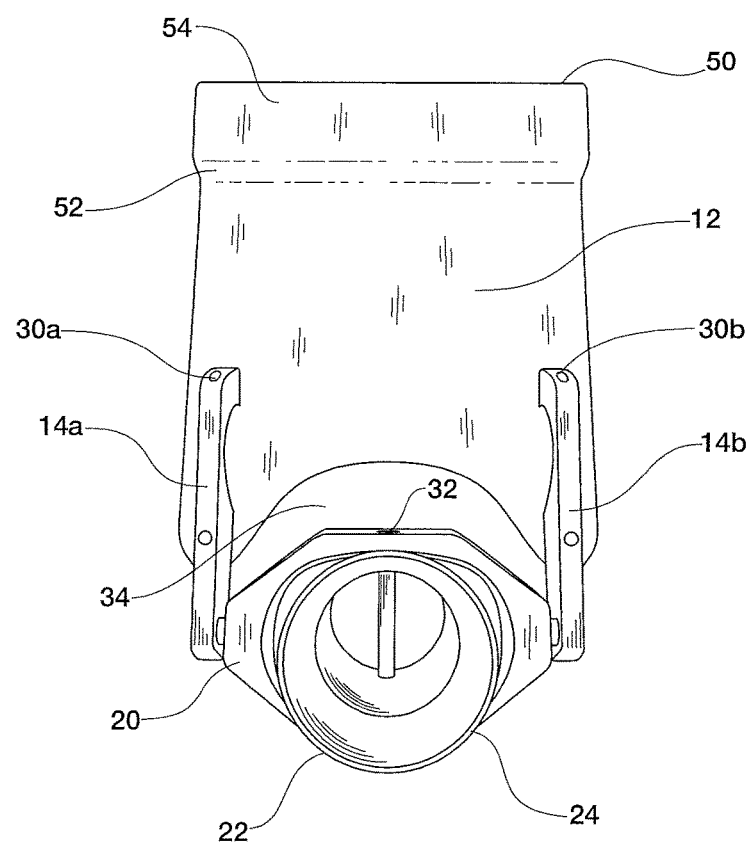
FIG. 2 is a top view of the embodiment shown in FIG. 1.

Turning to the embodiment in FIG. 2, support 14 includes a two-piece mounting arm assembly comprised of a pair of mounting arms 14 attached to the attachment area and acting as a support for mounting fishing rod holder assembly 20. As shown, fishing rod holder assembly 20 includes a gimbal rotatably mounted onto attachment area 16 at the distal portions of mounting arms 14a,b. Attachment area 16 includes a cavity 34 adapted to provide clearance for movement of a fishing rod butt rest 22 that is rotatably mounted onto gimbal 20 via fasteners 32. In the embodiment shown, fishing rod butt rest 22 is generally cylindrical shaped and adapted to receive at least a portion of a fishing rod, such as its handle butt cap. Fishing rod butt rest 22 may further include a stop pin 24 to secure the handle butt cap of a fishing rod. Stop pin 24 may be inserted into a cavity found on the bottom of the fishing rod's handle butt cap.

Figure 3:
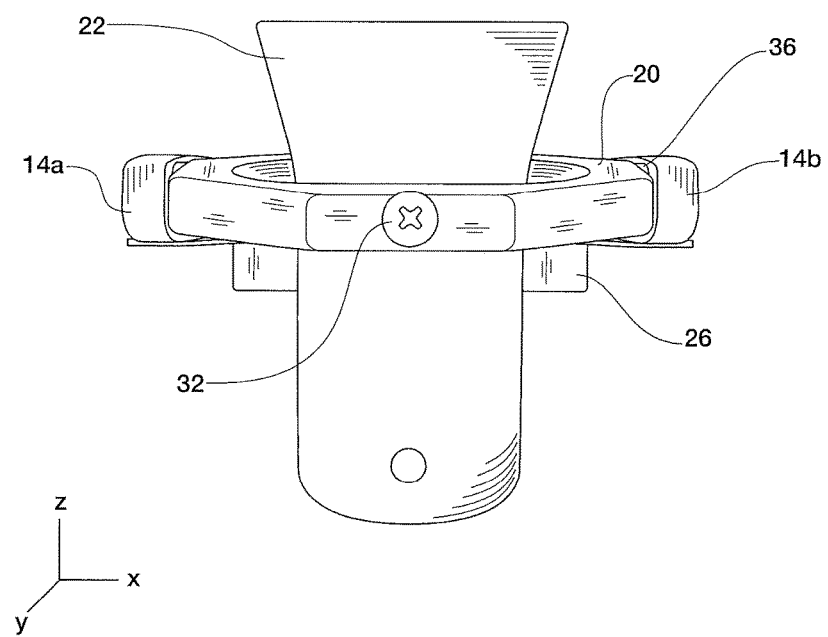
FIG. 3 is a front view of the embodiment shown in FIG. 1.

As seen in FIG. 3, fasteners 32 enable fishing rod butt rest 22 to pivot along the X-axis defined in FIG. 3. Gimbal 20 mounts onto mounting arms 14a,b using round prongs that are each inserted into a cavity within a mounting arm, thereby enabling gimbal 20 and holder 22 to swivel in the Y- and Z-planes. In some embodiments, the size of cavity 34 may prevent complete rotation of holder 22 within gimbal 20.

Figure 4:
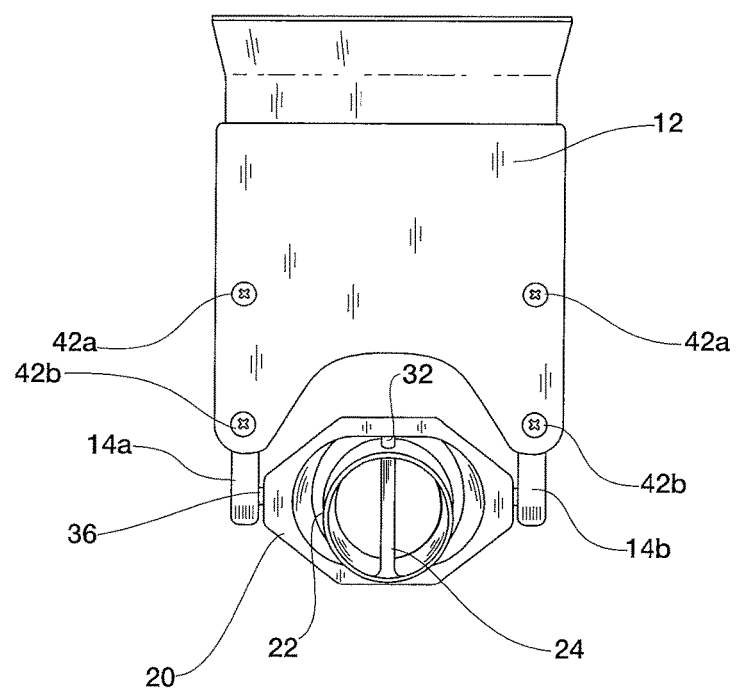
FIG. 4 is a bottom view of the embodiment shown in FIG. 1.

Mounting arm 26 may include a plurality of apertures 40 that are at least partially threaded and adapted to receive fasteners. As seen in FIG. 1, mounting arm includes a first aperture 40a located near a proximate end and a second aperture 40b located near a distal end of mounting arm 14. Cantilevered plate 12 may include accompanying apertures for the fasteners to be inserted through and into the mounting arms. As shown in FIG. 4, threaded fasteners 42a are inserted through the apertures of cantilevered plate 12 and received by apertures 40a of mounting arms 14. Threaded fasteners 42b are inserted through the apertures located toward a distal portion of the fishing rod holder assembly mounting area 16 and received by apertures 40b of mounting arms 14. However, other fastening means may be used to affix mounting arms 14 onto cantilevered plate 12. For example, bolts may be used in place of screws, which may be secured at one or both ends by a nut.

In the embodiment shown in FIG. 3, cantilevered plate 12 includes a mounting arm assembly wherein two mounting arms are installed on its top surface near its opposing sides. Installing the mounting arms onto the top surface unexpectedly provides a stronger support for fishing rod holder assembly 20 than installation on the bottom surface of cantilevered plate 12. In such embodiments, the tension forces applied to threaded fasteners 42b (i.e., a pulling force away from cantilevered plate 12) may be counterbalanced by compressive forces exerted on threaded fasteners 42a (i.e., a pushing force toward cantilevered plate 12). In contrast, alternative embodiments may have mounting arms installed on a bottom surface or on a side edge of cantilevered plate 12. In such embodiments, tension forces are applied to both threaded fasteners 42a and 42b, and may reduce structural strength of the system under applied stress.

Some embodiments may have one or more mounting arms 26 attached to the attachment area and acting as a support for installing fishing rod holder assembly 20. In alternative embodiments, the fishing rod holder assembly may be the fishing rod butt rest 22 directly mounted onto the attachment area. Other embodiments of fishing rod butt rest 22 may be adapted to receive various types of accessories in addition to a fishing rod handle. For example, such accessories may include beverages, phones, cameras, flashlights, lures, hooks, bobbers, or a combination thereof. Fishing rod butt rest 22 may also be adapted to hold a plurality of accessories. In such embodiments, fishing rod butt rest 22 may be integrally formed from cantilevered plate 12 or may be comprised of one or more separate pieces mounted onto cantilevered plate 12.

Cantilevered plate 12 includes a primary stop 50 to secure it to a cooler and prevent cantilevered plate 12 from slipping out of the cooler. Cantilevered plate 12 may also further include a secondary stop 52 to help prevent the cantilevered plate 12 from moving in a second direction and further secure the plate to the cooler. As seen in the embodiment in FIG. 5, primary stop 50 and secondary stop 52 are integrated with cantilevered plate 12 as a single piece. Primary stop 50 and secondary stop 52 are located at a proximate portion of cantilevered plate and adapted to be clamped between the lid and one of the sidewalls of the cooler. A spacing 54 may separate primary stop 50 and secondary stop 52, and may be used as a clamping area for the cooler. Spacing 54 may be integrated with cantilevered plate 12, and may be raised as seen in FIG. 5 to further secure cantilevered plate 12 to the cooler. Other examples of spacing 54 may include having a cavity in at least a portion of its clamping area. In other alternative embodiments, primary stop 14 and secondary stop 16 may be separately installed pieces mounted onto cantilevered plate 12.

In some embodiments, cantilevered plate 12 may also include a second secondary stop 56. As seen in the embodiment shown in FIG. 5, second secondary stop 56 may be formed from a proximate end of the mounting arms 14. Yet in other embodiments, second secondary stop 56 may be a separate stop installed onto cantilevered plate 12. Second secondary stop 56 is placed adjacent to the outside of one of the sidewalls of the cooler and provides further support for preventing the cantilevered plate from sliding in a second direction.

Figure 5A:
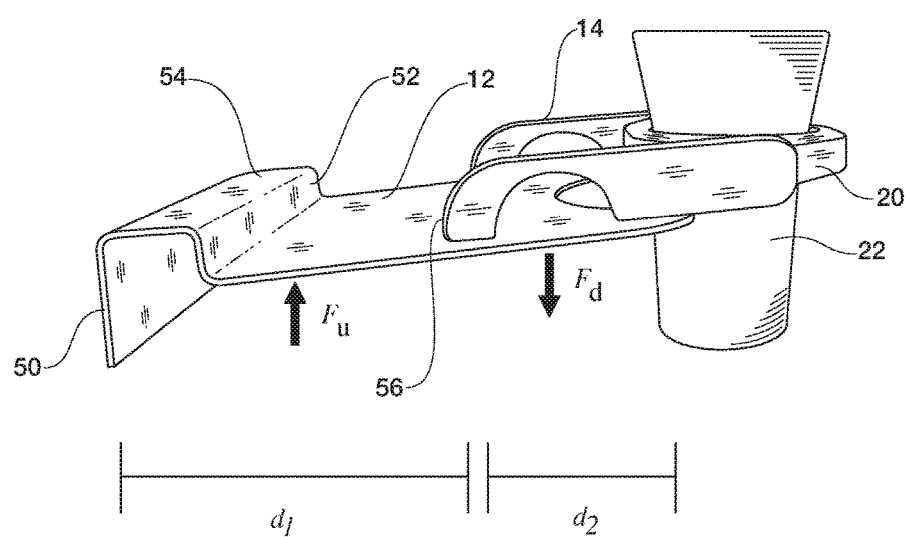
FIG. 5A is a side view of the embodiment shown in FIG. 1.

As seen in the embodiment of FIG. 5A, the location of the second secondary stop 56 where mounting arms 14 is proximately mounted defines a fulcrum. The distance between the proximate end of cantilevered plate 12 and second secondary stop 56 (defined as $d_1$) is preferably greater than or equal to the distance between the second secondary stop and the distal end of cantilevered plate 12 (defined as $d_2$). When the fastenerless support bracket is mounted onto a cooler, distance $d_2$ includes the portion of second secondary stop outside the cooler between the lid and one of the sidewalls of the cooler and the distal end of cantilevered plate 12 extending past the outside of one of the sidewalls of the cooler. While mounted, a downward force ($F_d$) transmitted from the distal end of cantilevered plate 12 will remain less than an upward force ($F_u$) transmitted by the proximate end of cantilevered plate 12 to the lid.

Figure 5B:
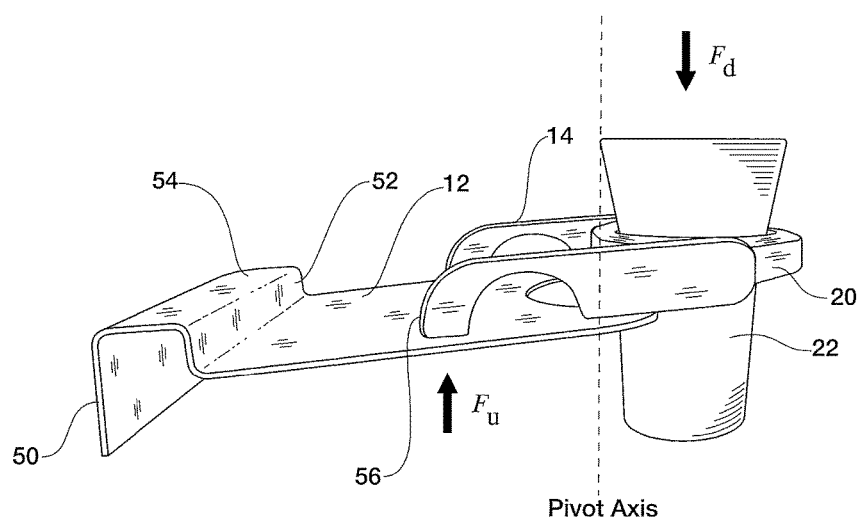
FIG. 5B is a side view of the embodiment shown in FIG. 1.

FIGS. 4 and 5B provides additional information regarding the structural features of the mounting arm assembly 14 when mounted on top of cantilevered plate 12. As shown in FIG. 5B, a downward force $F_d$ is transmitted onto the fishing rod holder assembly 20 during use. As $F_d$ is being transmitted, the fastener 42b acts as a pivot point and the fastener 42a (near second secondary stop 56) experiences an upward force $F_u$ equal to the magnitude of $F_d$. In essence, mounting the mounting arm assembly on top of the cantilevered plate 12 results in a class 1 lever.

Figure 5C:
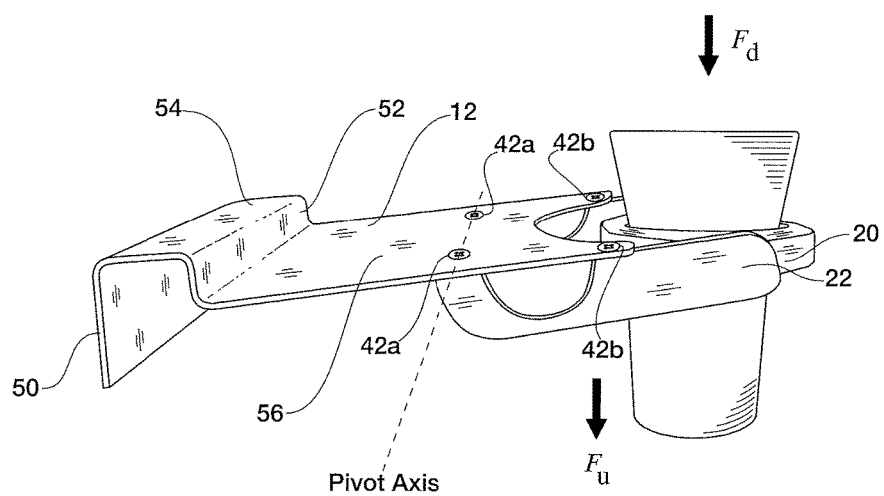
FIG. 5C is a side view of another embodiment of a fastenerless support bracket according to the present inventions.

FIG. 5C illustrates the differences in structural stability when the mounting arm assembly 14 is installed on the bottom of cantilevered plate 12. In this embodiment, the fastener 42a acts as a pivot point when a downward force $F_d$ is transmitted onto the fishing rod holder assembly 20. Unlike the embodiment in FIG. 5B, the fastener 42b experiences an upward force $F_u$ equal to approximately twice the magnitude of $F_d$ and thereby increasing the chances that a mounting arm will become disassembled from the cantilevered plate 12. In this class 3 lever model, each fastener 42a has a pivot point corresponding to a vertical pivot axis orthogonal to the cantilevered plate and corresponding to the length of the fastener.

Other mechanisms may be used to provide additional support for cantilevered plate 12. In one embodiment, cantilevered plate 12 includes a support brace adapted to prevent the distal end of the cantilevered plate from bending downwardly. For example, the support brace may comprise a lower support installed on the bottom surface of the cantilevered plate. The lower support may comprise various shapes or structures. For instance, the lower support may be wedge-shaped. In another example, the lower support is a substantially rigid wall positioned generally perpendicularly with respect to the horizontal surface of cantilevered plate 12. In yet another example, the lower support may be an inverted T-shaped brace positioned generally diagonally with respect to the horizontal surface of the cantilevered plate. In some embodiments, a support truss may be formed from a plurality of inverted T-shaped braces. These and other structures may be employed to help maintain the structural rigidity of cantilevered plate 12 and prevent bending.

Figure 6A:
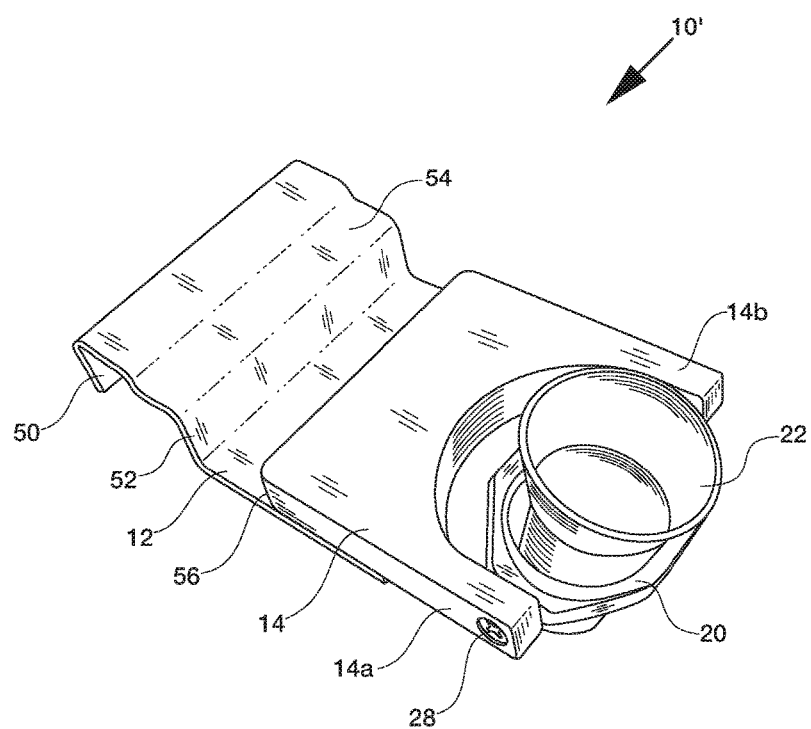
FIG. 6A is an overhead perspective view of another embodiment of a fastenerless support bracket according to the present inventions.
Figure 6B:
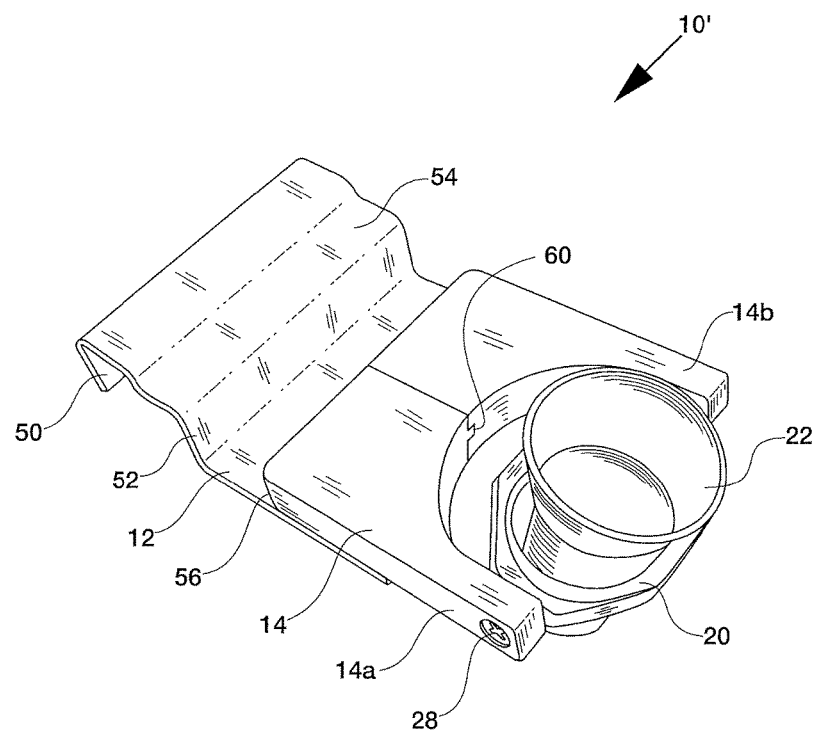
FIG. 6B is an overhead perspective view of another embodiment wherein the one piece mounting arm assembly is comprised of two components.
Figure 6C:
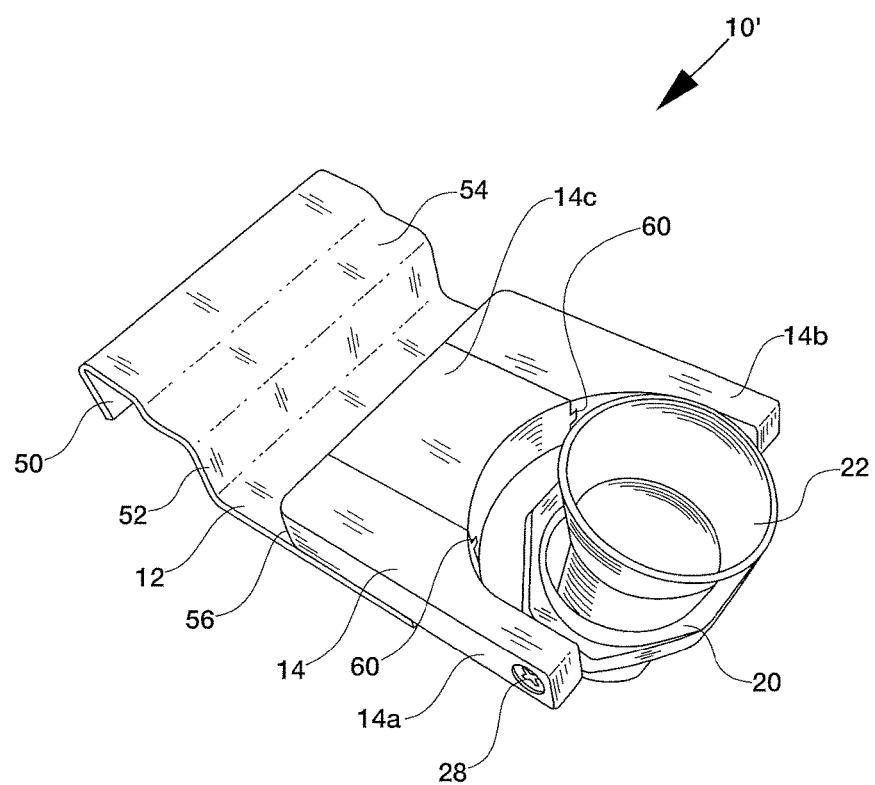
FIG. 6C is an overhead perspective view of another embodiment wherein the one piece mounting arm assembly is comprised of three components.
Figure 7:
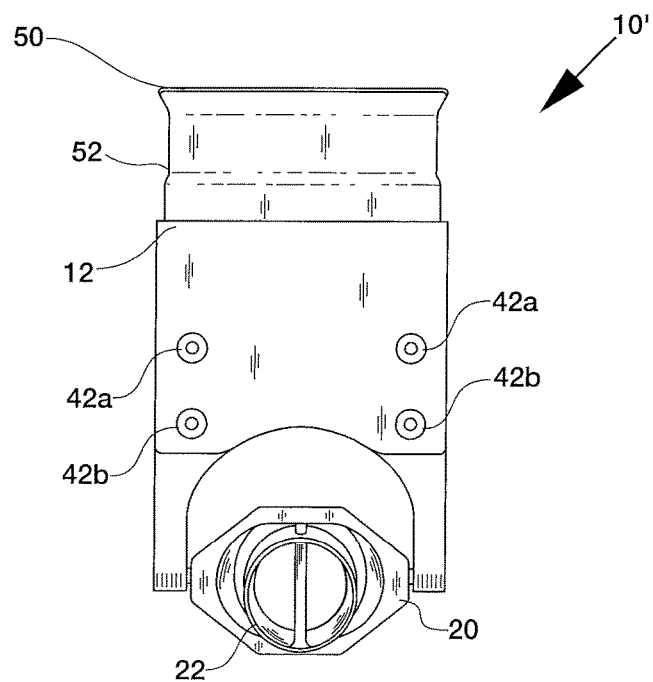
FIG. 7 is a bottom view of the embodiment shown in FIG. 6A.
Figure 8:
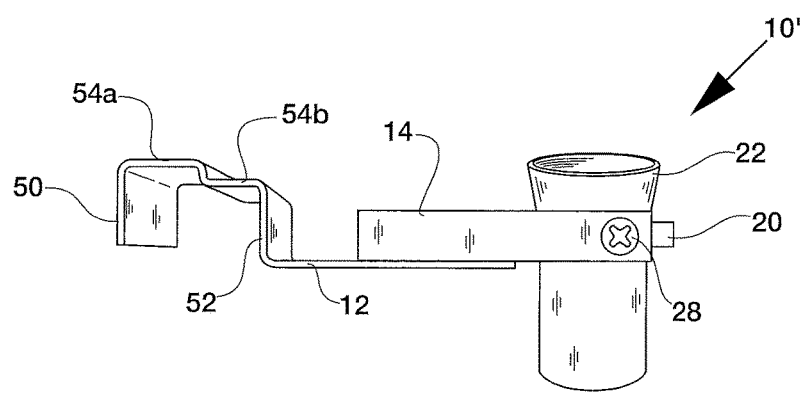
FIG. 8 is a side perspective view of the embodiment shown in FIG. 6A.

Turning to FIGS. 6-8, additional embodiments are shown constructed according to the present inventions. As shown in FIG. 6A, a fastenerless support bracket 10" comprises a cantilevered plate 12 with a support 14 toward a distal end of the plate for receiving a fishing rod holder assembly. The cantilevered plate 12 includes a primary stop 50 located toward a proximate end of cantilevered plate 12 for securing the bracket 10" and a secondary stop 52 to help prevent the cantilevered plate 12 from moving in a second direction and further secure the plate to the cooler. In this embodiment, support 14 includes a mounting arm assembly comprised of a one piece forming a second secondary stop 56 at a proximate end and having projections forming mounting arms 14a and 14b toward a distal end that are adapted to mount a fishing rod holder assembly.

Variations of this embodiment may include multiple components that attach to form a one piece mounting arm assembly when installed onto the cantilevered plate 12. For example, as seen in FIG. 6B, the one-piece mounting arm assembly may comprise two components 14a and 14b wherein each component includes a single projection forming a mounting arm 14. Components may attach together by a variety of means. For instance, as seen in FIG. 6B, the components may attach via tongue and groove joints 60. Bolts may also be used to fasten multiple components together. Similarly, FIG. 6C shows another embodiment wherein the one-piece mounting arm assembly is comprised of three components: 1) a first mounting arm 14a; 2) a second mounting arm 14b; and 3) a connecting body 14c.

In the embodiments shown in FIGS. 6A-6C, the fishing rod holder assembly comprises a gimbal 20 mounted onto mounting arms 14a,14b using countersunk machine screws for additional structural support preventing the gimbal from dismounting during heavy use.

As seen in FIG. 7, support 14 is secured onto cantilevered plate 12 using countersunk screws. Using a stainless steel block and countersunk screws provides additional structural stability to mounting arms 14a,14b and prevents them from bending or detaching from cantilevered plate 12 while angling. The thickness of the stainless steel block may vary. In the embodiment shown, support 14 is approximately 0.5 inches thick.

In some embodiments, spacing 54 may comprise more than one planar area for clamping. For instance, as seen in FIG. 8, spacing 54 may include a first clamping area 54a and a second clamping area 54b, wherein the second clamping area 54b is lower than the first. Spacing 54 may be modified in other embodiments to match the contour of the cooler sidewall and lid that the fastenerless support bracket is installed onto. For example, the widths and/or lengths of each clamping area may be modified to provide the best contoured fit for the fastenerless support bracket when installed onto a cooler.

Figure 9:
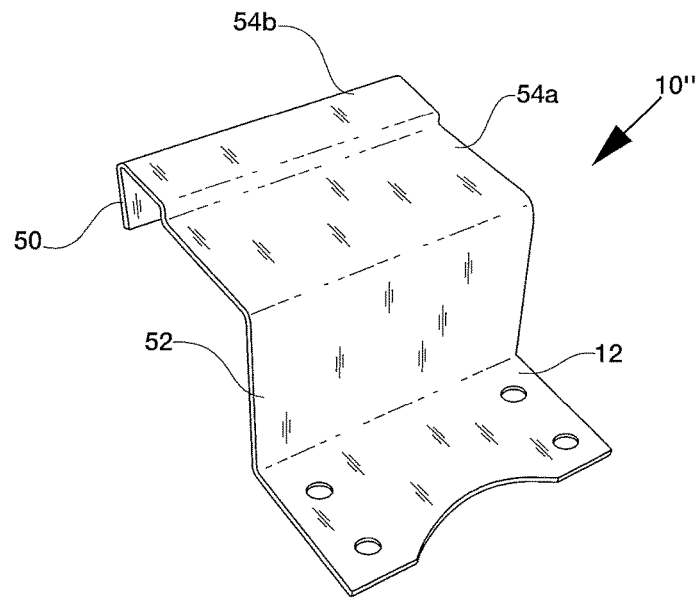
FIG. 9 is an overhead perspective view of another embodiment of a cantilevered plate according to the present inventions.
Figure 10:
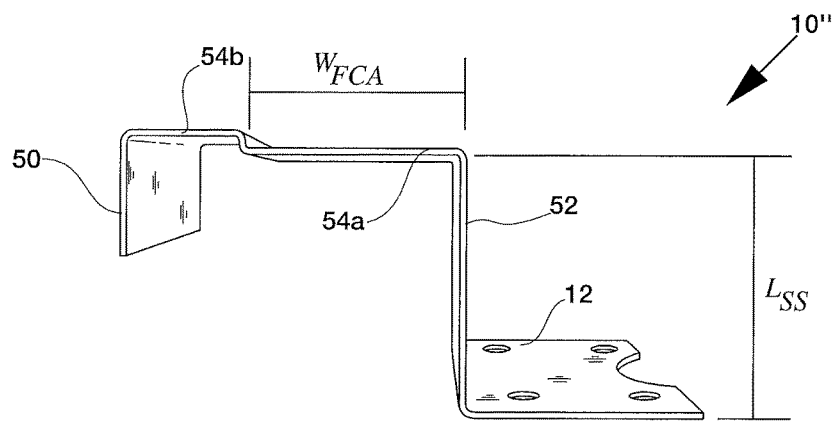
FIG. 10 is a side perspective view of the embodiment shown in FIG. 9.

Alternative embodiments of the fastenerless support bracket may be modified to provide a more secure fit for the bracket. As an example, the lengths of primary stop 50 and secondary stop 52 may vary as well as the spacing 54 between the two stops. For instance, FIGS. 9 and 10 illustrate one alternative embodiment wherein the secondary stop 52 and spacing 54 are modified to provide additional support and enable the fastenerless support bracket 10" to remain installed onto a cooler regardless if its lid is opened or closed. In the embodiment shown, the length $L_{SS}$ of secondary stop 52 is about 2.5 inches and the width $W_{FCA}$ of the first clamping area 54a is about 2 inches. Increasing the width $W_{FCA}$ enables the first and second clamping areas to sit entirely on the edge of a cooler's sidewall, and orients the secondary stop 52 adjacent to an exterior wall of a cooler. Having a width $W_{FCA}$ and a width $W_{SCA}$ (corresponding to the second clamping area 54b) that are combined less than the width of a cooler's edge may require the lid to be closed for the fastenerless support bracket to remain mounted, particularly if the length $L_{SS}$ is less than about one inch. Otherwise, the weight of the support 14 and fishing rod holder assembly 20 may cause the fastenerless support bracket to tip over when the lid is opened.

FIG. 11 is a graphic illustration to provide a visual representation of the relationship between the mounting position and the number of pieces of the mounting arm assembly. The various embodiments are separated into quadrants. The upper quadrants indicate those embodiments wherein the mounting arm assembly is installed on top of the cantilevered plate 12. The lower quadrants indicate those embodiments wherein the mounting arm assembly is installed on the bottom of the cantilevered plate 12. The left quadrants indicate embodiments wherein the mounting arm assembly is comprised of two pieces when assembled (e.g., as seen in the embodiment of FIG. 1). The right quadrants indicate embodiments wherein the mounting arm assembly is comprised of one piece when its components are assembled (e.g., as seen in the embodiments depicted in FIGS. 6A-6C). The right quadrants are further divided by the number of components comprising the mounting arm assembly. The various embodiments are ranked based on their structural stability, wherein "1" indicates a weak structure and "5" indicates the strongest and most preferred structure.

As discussed above, installing the mounting arm assembly on top of the cantilevered plate 12 provides greater structural stability than installing the mounting arm assembly on the bottom. Installing the mounting arm assembly on the bottom of place places a roughly two-fold increased force on fasteners 42b, and therefore lead to a roughly two-fold decrease in structural stability for these embodiments in comparison to the same mounting arm assembly installed on top of the plate.

Installing the mounting arm assembly as one piece, as opposed to two pieces (e.g., as seen in the embodiment of FIG. 1), leads to reduced torsional loads thereby increasing the structural stability. Furthermore, reducing the number of components in the one piece mounting arm assembly increases its strength. Thus, a one-component one piece mounting arm assembly is most preferred (e.g., as seen in FIG. 6A).

Figure 12:
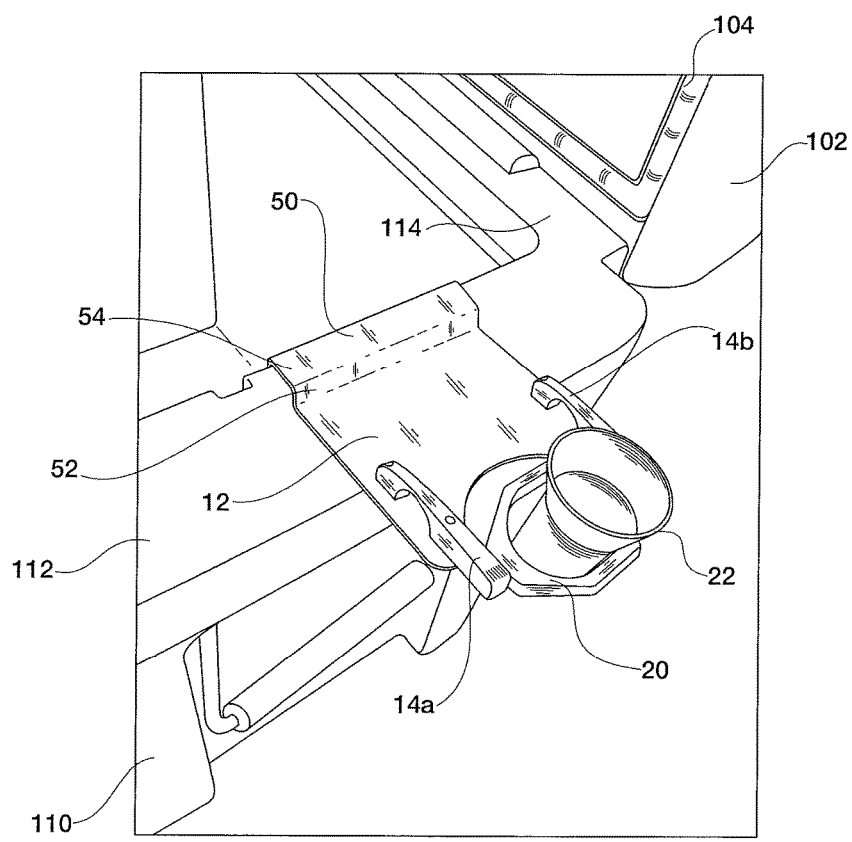
FIG. 12 is an overhead perspective view of a cooler having a fastenerless support bracket for a fishing rod holder assembly constructed according to the present inventions.
Figure 13:
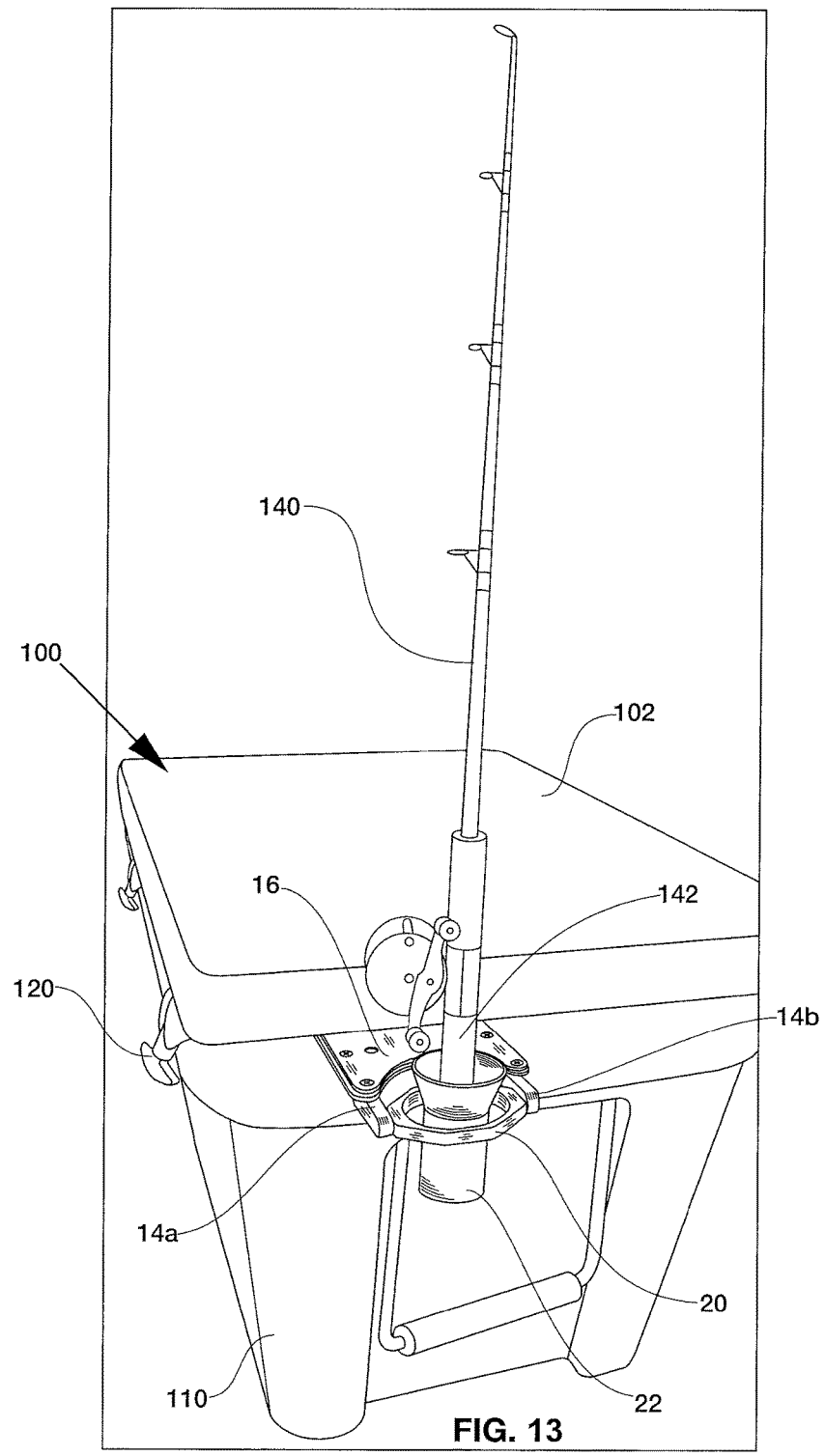
FIG. 13 is a perspective view of a cooler having a fastenerless support bracket for a fishing rod holder assembly with the lid of the cooler closed constructed according to the present inventions.

FIGS. 12 and 13 show embodiments of a fastenerless support bracket installed onto a cooler. In operation, primary stop 50 is placed adjacent to the inside of one of the sidewalls 110 of a cooler 100 and is responsible for preventing cantilevered plate 12 from sliding in a first direction. Secondary stop 52 is typically placed adjacent to the upper portion of one of the sidewalls of a cooler and is responsible for preventing the cantilevered plate from sliding in a second direction. As shown in FIG. 6A, the top of sidewall 110 includes a distal portion 112 and a raised proximate portion 114. Secondary stop 52 is placed adjacent to raised proximate portion 114, with a portion of cantilevered plate 12 covering distal portion 112. When cooler 100 is closed, raised proximate portion 114 and spacing 54 securely mate with cavity 104 of lid 102. In the embodiment shown, at least a portion of cantilevered plate 12 is clamped by lid 102. Lid 102 may be further secured using lock assembly 120. Handle 142 of fishing rod 140 is inserted into the fishing rod holder assembly. FIG. 6A shows an embodiment wherein mounting arms 14 are installed on a top surface of cantilevered plate 12. When the cooler is closed, mounting arms 14 act as second secondary stops 56. FIG. 7 shows an alternative embodiment wherein mounting arms 14 are installed on a bottom surface of cantilevered plate 12. Like the embodiment shown in FIG. 6A, mounting arms 14 may act as second secondary stops 56.

Certain modifications and improvements will occur to those skilled in the art upon a reading of the foregoing description. By way of example, the primary stop or secondary stop may be of a length that spans the length of the sidewalls. Also, secondary stop may be a wedge integral with the plate that is placed below the cooler. It should be understood that all such modifications and improvements have been deleted herein for the sake of conciseness and readability but are properly within the scope of the following claims.

We claim:

1. A cooler having a support bracket comprising:
   (a) the cooler having a bottom, sidewalls and a lid; and
   (b) a fastenerless support bracket adapted to be clamped between the lid and one of the sidewalls of said cooler, said fastenerless support bracket including (i) a cantilevered plate adapted to receive a fishing rod holder assembly; (ii) a primary stop adjacent to the inside of one of said sidewalls, said primary stop adapted to prevent said cantilevered plate from sliding in a first direction; and (iii) a secondary stop adjacent to the upper portion of one of said sidewalls adapted to prevent said cantilevered plate from sliding in a second direction, wherein said primary stop and said secondary stop are positioned at a proximate portion of said cantilevered plate that is closer to said cooler and adapted to be clamped between the lid and one of the sidewalls of the cooler;
   (c) a mounting arm assembly attached to a top surface of said cantilevered plate, wherein a proximate end of said mounting arm assembly forms a second secondary stop adjacent to the outside of one of the sidewalls also adapted to prevent said cantilevered plate from sliding in said second direction;
   (d) a fishing rod holder assembly mounted onto said mounting arm assembly at the distal end of said fastenerless support bracket that is positioned away from said cooler.

2. The cooler according to claim 1, wherein the fishing rod holder assembly includes a gimbal rotatably mounted onto said fastenerless support bracket.

3. The cooler according to claim 2 further including a fishing rod butt rest rotatably mounted onto said gimbal and adapted to receive the handle butt cap of a fishing rod.

4. The cooler according to claim 3, wherein the fishing rod butt rest is generally cylindrical shaped.

5. The cooler according to claim 3 further including a stop pin adapted to mate with a lower end of the handle butt cap of the fishing rod.

6. The cooler according to claim 1, wherein said lid is hinged to the top of said sidewalls.

7. The cooler according to claim 6 further including a lock assembly adapted to close and secure said lid onto said cooler.

8. A support bracket for a portable cooler having a bottom, sidewalls and a lid, said support bracket adapted to be clamped between the lid and one of the sidewalls of the cooler, said support bracket comprising:
   (a) a cantilevered plate adapted to receive a fishing rod holder assembly;
   (b) a primary stop adapted to be positioned adjacent to the inside of one of the sidewalls, said primary stop adapted to prevent said cantilevered plate from sliding in a first direction; and
   (c) a secondary stop adapted to be positioned adjacent to the upper portion of one of the sidewalls and adapted to prevent said cantilevered plate from sliding in a second direction, wherein said primary stop and said secondary stop are at a proximate portion of said cantilevered plate and adapted to be clamped between the lid and one of the sidewalls of the cooler;
   (d) a mounting arm assembly attached to a top surface of said cantilevered plate, wherein a proximate end of said mounting arm assembly forms a second secondary stop adapted to be positioned adjacent to the outside of one of the sidewalls also adapted to prevent said cantilevered plate from sliding in said second direction;
   (e) a fishing rod holder assembly mounted onto said mounting arm assembly at the distal end of said fastenerless support bracket.

9. The support bracket according to claim 8, wherein said cantilevered plate includes a first clamping area on said cantilevered plate adapted to be clamped between the lid and one of the sidewalls of the cooler in order to secure said cantilevered plate to the cooler.

10. The support bracket according to claim 9, wherein said cantilevered plate further includes a second clamping area on said cantilevered plate adapted to be clamped between the lid and one of the sidewalls of the cooler in order to secure said cantilevered plate to the cooler, said second clamping area located between said primary stop and said secondary stop.

11. The support bracket according to claim 10, wherein said first clamping area is located between said second clamping area and said secondary stop.

12. The support bracket according to claim 8, wherein said cantilevered plate includes an attachment area for receiving a fishing rod holder assembly.

13. The support bracket according to claim 12, wherein said attachment area is a generally horizontal surface.

14. The support bracket according to claim 13, wherein said generally horizontal surface is flanged on at least one side to increase the rigidity of said generally horizontal surface.

15. The support bracket according to claim 13, wherein said attachment area further includes a cavity adapted to provide clearance for movement of the fishing rod holder assembly.

16. The support bracket according to claim 13, wherein said mounting arm assembly is affixed to said cantilevered plate using a first fastener and a second fastener, said first fastener having a compressive force applied when a tension force is applied to said second fastener.

17. The support bracket according to claim 8 further including a second secondary stop adapted to be positioned adjacent to the outside of one of the sidewalls and also adapted to prevent said cantilevered plate from sliding in said second direction.

18. The support bracket according to claim 17, wherein the edge of said second secondary stop adapted to be positioned adjacent to the outside of one of the sidewalls of the cooler defines a fulcrum and the distance between the proximate end of said cantilevered plate and said second secondary stop is greater than or equal to the distance between the second secondary stop adapted to be positioned extending inside the cooler between the lid and one of the sidewalls of the cooler and that the distal end of said cantilevered plate adapted to be positioned extending past the outside of one of the sidewalls, whereby a downward force transmitted from the distal end of said cantilevered plate by the fishing rod holder assembly will remain less than an upward force transmitted by the proximate end of said cantilevered plate to the lid.

19. A cooler having a support bracket comprising:
   (a) the cooler having a bottom, sidewalls and a lid;
   (b) a support bracket, said support bracket including (i) a cantilevered plate adapted to receive a fishing rod holder assembly; (ii) a primary stop adjacent to the inside of one of said sidewalls, said primary stop adapted to prevent said cantilevered plate from sliding in a first direction; and (iii) a secondary stop adjacent to the upper portion of one of said sidewalls adapted to prevent said cantilevered plate from sliding in a second direction, wherein said primary stop and said secondary stop are at a proximate portion of said cantilevered plate that is closer to said cooler and adapted to be clamped between the lid and one of the sidewalls of the cooler;
   (c) a mounting arm assembly attached to a top surface of said cantilevered plate, wherein a proximate end of said mounting arm assembly that is closer to said cooler forms a second secondary stop adjacent to the outside of one of the sidewalls also adapted to prevent said cantilevered plate from sliding in said second direction;
   (d) a fishing rod holder assembly mounted onto said mounting arm assembly at the distal end of said fastenerless support bracket that is further away from said cooler,
   wherein the edge of said second secondary stop adjacent to the outside of one of the sidewalls of the cooler defines a fulcrum and the distance between the proximate end of said cantilevered plate and said second secondary stop is greater than or equal to the distance between the second secondary stop extending inside the cooler between the lid and one of the sidewalls of the cooler and that the distal end of said cantilevered plate extending past the outside of one of the sidewalls, whereby a downward force transmitted from the distal end of said cantilevered plate by the fishing rod holder assembly will remain less than an upward force transmitted by the proximate end of said cantilevered plate to the lid.

20. The cooler according to claim 19, wherein the fishing rod holder assembly includes a gimbal rotatably mounted onto said support bracket.

21. The cooler according to claim 20 further including a fishing rod butt rest rotatably mounted onto said gimbal and adapted to receive the handle butt cap of a fishing rod.

22. The cooler according to claim 21, wherein the fishing rod butt rest is generally cylindrical shaped.

23. The cooler according to claim 21 further including a stop pin adapted to mate with a lower end of the handle butt cap of the fishing rod.

24. The cooler according to claim 19, wherein said lid is hinged to the top of said sidewalls.

25. The cooler according to claim 24 further including a lock assembly adapted to close and secure said lid onto said cooler.

26. The cooler according to claim 19, wherein said cantilevered plate includes a first clamping area on said cantilevered plate adapted to be clamped between the lid and one of the sidewalls of the cooler in order to secure said cantilevered plate to the cooler.

27. The cooler according to claim 26, wherein said cantilevered plate further includes a second clamping area on said cantilevered plate adapted to be clamped between the lid and one of the sidewalls of the cooler in order to secure said cantilevered plate to the cooler, said second clamping area located between said primary stop and said secondary stop.

28. The cooler according to claim 27, wherein said first clamping area is located between said second clamping area and said secondary stop.

29. The cooler according to claim 19, wherein said cantilevered plate includes an attachment area on an end of said cantilevered plate for receiving a fishing rod holder assembly.

30. The cooler according to claim 29, wherein said attachment area is a generally horizontal surface.

31. The cooler according to claim 30, wherein said generally horizontal surface is flanged on at least one side to increase the rigidity of said generally horizontal surface.

32. The cooler according to claim 29, wherein said attachment area further includes a cavity adapted to provide clearance for movement of the fishing rod holder assembly.

* * * * *